US008588096B2

(12) United States Patent
Riddington et al.

(10) Patent No.: US 8,588,096 B2
(45) Date of Patent: Nov. 19, 2013

(54) LINK QUALITY REPORTING FOR A COMMUNICATION SYSTEM CAPABLE OF USING DIFFERENT MODULATION SCHEMES

(75) Inventors: Eddie Riddington, Middlesex (GB); Eswar Vutukuri, Hedge End (GB); Hartmut Wilhelm, Ulm (DE)

(73) Assignee: Nokia Siemens Networks Oy, Espoo (FI)

( * ) Notice: Subject to any disclaimer, the term of this patent is extended or adjusted under 35 U.S.C. 154(b) by 164 days.

(21) Appl. No.: 13/058,029

(22) PCT Filed: Aug. 7, 2009

(86) PCT No.: PCT/EP2009/060288
§ 371 (c)(1),
(2), (4) Date: Apr. 20, 2011

(87) PCT Pub. No.: WO2010/015707
PCT Pub. Date: Feb. 11, 2010

(65) Prior Publication Data
US 2011/0194445 A1    Aug. 11, 2011

(30) Foreign Application Priority Data
Aug. 8, 2008  (EP) .................................. 08105001

(51) Int. Cl.
*H04L 12/28* (2006.01)

(52) U.S. Cl.
USPC .............................. 370/252; 375/224; 379/35

(58) Field of Classification Search
USPC ................. 370/252, 259; 455/67.13
See application file for complete search history.

(56) References Cited

U.S. PATENT DOCUMENTS

| 7,107,013 B2 * | 9/2006 | Qiu ........................... 455/67.13 |
| 8,325,624 B2 * | 12/2012 | Hammarwall et al. ....... 370/252 |
| 2004/0022176 A1 | 2/2004 | Hashimoto et al. |
| 2005/0213674 A1 * | 9/2005 | Kobayashi .................... 375/259 |

FOREIGN PATENT DOCUMENTS

GB    2 410 152 A    7/2005

* cited by examiner

*Primary Examiner* — Dang Ton
*Assistant Examiner* — Lionel Preval
(74) *Attorney, Agent, or Firm* — Harrington & Smith

(57) ABSTRACT

It is described a method for reporting, in a link quality report, link quality information from a link quality report sending station to a link quality report receiving station. The link quality report receiving station is capable of using different modulation schemes for communicating to the link quality report sending station. Depending on a priority of each of at least two of said different modulation schemes, at least one of said at least two modulation schemes are selected for inclusion of corresponding link quality information in said link quality report. According to an embodiment, the priority of each of said at least two modulation schemes is determined depending on a link quality parameter value.

12 Claims, 3 Drawing Sheets

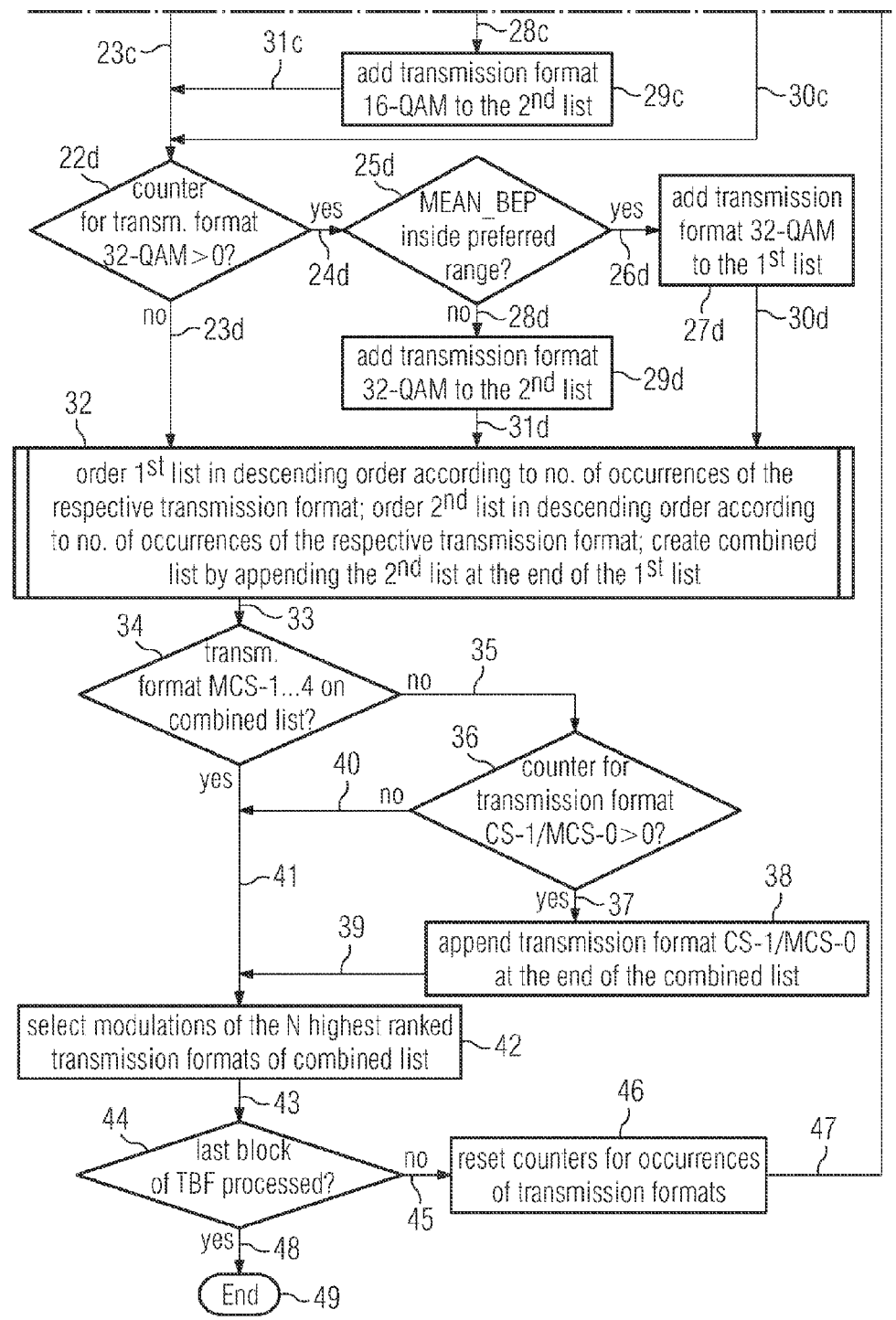

| modulation schemes | transmission formats defined in this example |
|---|---|
| GMSK | MCS-1...4 (MCS-1, MCS-2, MCS-3, MCS-4) |
| GMSK | CS-1/MCS-0 (these coding schemes are only used for signalling, not for payload) |
| 8-PSK | 8-PSK |
| 16-QAM* | 16-QAM |
| 32-QAM* | 32-QAM |

LINK QUALITY REPORTING FOR A COMMUNICATION SYSTEM CAPABLE OF USING DIFFERENT MODULATION SCHEMES

FIELD OF INVENTION

The present invention relates to the field of reporting link quality. In particular, the present invention relates to reporting link quality from a link quality report sending station to a link quality report receiving station.

One possible application of the subject matter disclosed herein are links over an air interface, e.g. by using EGPRS2. EGPRS2 is a Rel-7 feature in GERAN (GSM EDGE Radio Access Network). As part of the EGPRS2, three new modulations (QPSK, 16-QAM and 32-QAM) were introduced and a new symbol rate was also defined (325 ksymbols/s).

In downlink, two levels of EGPRS2 are defined according to the modulation schemes (combinations of modulation and symbol rate) they support:
- EGPRS2-A: Using 4 different modulation schemes GMSK, 8-PSK, 16-QAM and 32-QAM all at normal symbol rate (270.833 ksymbols/s).
- EGPRS2-B: Using 7 different modulation schemes: GMSK, 8-PSK, 16-QAM, 32-QAM at normal symbol rate (270.833 ksymbols/s) and QPSK, 16-QAM and 32-QAM at higher symbol rate (325 ksymbols/s).

In EGPRS, the throughput on the air interface is maximised by choosing the modulation scheme and the code rate (of the FEC code) to suit the channel conditions. This process of choosing an appropriate modulation and coding scheme is called link adaptation (LA). In uplink, i.e. in the direction from the mobile station to the network, the channel conditions are known to the network (as it is receiving the data) and hence the network orders the mobile station to use an appropriate modulation and coding scheme. In downlink however, only the mobile station knows the channel conditions and hence the network has to rely on reports from the mobile station regarding the channel conditions in downlink. These reports, often referred to as 'channel quality reports' or 'link quality reports', include an indication of which modulation schemes were received during a reporting period, and the mean bit error probability (MEAN_BEP) and the coefficient of variation of the bit error probability (CV_BEP) of the respective modulation schemes.

In EGPRS, the above channel quality report covers at most 2 modulation schemes. This channel quality report needs to be extended for the case of EGPRS2 such that the message size is hardly increased and that the most useful information is reported to the network.

Reporting the channel quality in the downlink to the network takes uplink resources. Furthermore, the space available in the signalling messages that carry the channel quality reports is limited. Signalling messages on the uplink can not be segmented and the messages carrying the channel quality reports on the uplink also normally carry an ACK/NACK bitmap for the downlink blocks. Hence, if more space is taken by the channel quality reports, only a few downlink blocks can be acknowledged, thereby potentially leading to a RLC stall or the need to use more uplink resources by polling more frequently. For these reasons, it is not always practical to report the BEP parameters of all the received downlink modulation schemes.

Since the number of modulation schemes is increased to 4 for EGPRS2-A and increased to 7 for EGPRS2-B as highlighted above, it is imperative that some rules are defined which ensure that no more modulation schemes are reported than are necessary.

The network can order the MS to report MEAN_BEP and CV_BEP for the two modulation schemes with which the MS has received most of the radio blocks addressed to it during the reporting period [3GPP TS 45.008 V7.11.0]. However, it is possible that the report covers only modulation schemes which do not fit to the current radio conditions or which, in the current TBF mode, are only intended for retransmissions or for compatibility with other MS. Such a report would be only of little usefulness for the link adaptation which needs to select from a modulation scheme that fits to the current radio conditions the modulation and coding scheme which meets the quality of service requirements best.

There may be a need to report link quality information with low uplink resource demand to a link quality report receiving station, which is capable of using different modulation schemes.

SUMMARY OF THE INVENTION

This need may be met by the subject matter according to the independent claims. Advantageous embodiments of the present invention are described by the dependent claims.

According to a first aspect of the invention there is provided a method for reporting, in a link quality report, link quality information from a link quality report sending station to a link quality report receiving station. Herein, the link quality report receiving station is capable of using different modulation schemes for communicating to the link quality report sending station. A modulation scheme is defined by at least a modulation and a symbol rate.

According to illustrative embodiments of the first aspect, the modulations scheme may be optionally further defined by additional parameters, e.g. a code rate, etc.

Further, the method for reporting link quality information comprises selecting, depending on a priority of each of at least two of said different modulation schemes, at least one of said at least two modulation schemes for inclusion of corresponding link quality information in said link quality report. Herein, the priority is the priority for inclusion of link quality information of the corresponding modulation scheme in the link quality report.

According to the first aspect, the selected at least one modulation scheme is/are the modulation scheme(s) which have the highest priority.

According to an illustrative embodiment, wherein a single modulation scheme is selected for inclusion in the link quality report, the selected modulation scheme is the modulation scheme which has the highest priority.

According to a further illustrative embodiment, wherein two or more modulation schemes are selected for inclusion in the link quality report, the selected modulation schemes are the modulation schemes which have the highest priority among at least two modulation schemes which are addressed to and received by the link quality report sending station. According to an illustrative embodiment, "addressed to" means that a temporary flow identifier of a received modulation scheme or of a data unit which uses the respective modulation scheme belongs to the link quality report sending station. A data unit can be any unit that contains information. According to a still further illustrative embodiment of the first aspect, a data unit forms a decodable entity (i.e. an entity that can be decoded, e.g. a radio block in GPRS).

Further according to the first aspect of the herein disclosed subject matter, the priority of each of said at least two modulation schemes is determined depending on at least one of
  (i) a link quality parameter value associated with the respective modulation scheme, said link quality parameter indicating a quality of a transmission using the respective modulation scheme from said link quality report receiving station to said link quality report sending station,
  (ii) a preference parameter associated with the modulation scheme, e.g. said preference parameter indicating a different preference, e.g. a lower preference, for the modulation scheme if the modulation scheme is used only for at least one of compatibility reasons and retransmission, and
  (iii) whether the modulation scheme has been used for signalling to the link quality report sending station or whether the modulation scheme has been used for transmitting payload to the link quality report sending station.

According to a further illustrative embodiment, the dependencies (i) and/or (iii) refer to a reporting period. A reporting period is a time period to which the link quality report refers, e.g. a time period beginning when the link quality report sending station has compiled the previous report. This definition of the reporting period does not exclude a situation where a link quality information depends on a link quality parameter value that has been determined before the reporting period under consideration. For instance, the link quality information in a link quality report may depend on the link quality of a longer time period than the reporting period to which the link quality report refers, e.g. due to filtering of a link quality parameter value (cf. MEAN_BEP averaging according to 3GPP TS 45.008 V7.11.0, section 10.2.3.2.1).

In an illustrative embodiment, the preference parameter of a modulation scheme indicates a preference, in particular a general preference, for inclusion of link quality information of the modulation scheme in the link quality report. This preference parameter is associated with the modulation scheme, it is for example predefined. In an embodiment, it is predefined differently for different operating conditions. In an embodiment, the preference parameters of modulation schemes which have been received by the link quality report sending station during the reporting period bias the priority for inclusion of link quality information of the respective modulation schemes in the link quality report. In an example, the preference parameter of a modulation scheme is defined such that it reflects how desirable the use of the modulation scheme is in general. In another example, the preference parameter of a modulation scheme is defined such that it reflects how useful the link quality information of the modulation scheme is in general for the link quality report receiving station. In illustrative embodiments, a preference parameter is defined by or in the link quality report receiving station (or alternatively by another network element). In this case, the link quality report receiving station transmits the preference parameter to the link quality report sending station. In another embodiment, a preference parameter of a modulation scheme is predefined in a standard and hence is implemented in the link quality report sending station. In a GSM related embodiment, the preference parameter of a modulation scheme is fixed for a TBF or even for all TBFs that use the same TBF mode. In a further embodiment, the preference parameter of a modulation scheme is a function of the modulation order, e.g. the more bits a modulation scheme provides per symbol, the higher is the preference indicated by the preference parameter. In yet another embodiment, there are groups of modulation schemes which have the same preference parameter.

According to a further illustrative embodiment, said preference parameter indicates a lower preference of a modulation scheme which is used only for at least one of compatibility reasons and retransmission compared with the preference of a modulation schemes which is not only used for compatibility reasons and/or retransmission. According to a further illustrative embodiment, relating to GSM, item ii) corresponds to the case that said preference parameter indicates a different preference, e.g. a lower preference, for the modulation scheme if the modulation scheme is used in the current TBF (temporary block flow) mode only for at least one of compatibility reasons and retransmission.

In an example for EGPRS2-B DL, the preference parameter associated with the modulation schemes GMSK, QPSK, 16-QAM (HSR) and 32-QAM (HSR) indicates a preference for these modulation schemes. Since the only motivation to use 8-PSK, 16-QAM (NSR) and 32-QAM (NSR) in an EGPRS2-B DL TBF is for compatibility with MS not supporting EGPRS2-B DL or for retransmissions of RLC data blocks (in particular RLC data blocks of family 'A padding' initially transmitted using DBS-11), the preference parameter associated with these three modulation schemes indicates no preference, e.g. leading to a lower priority than for the modulation schemes (GMSK, QPSK, 16-QAM (HSR) and 32-QAM (HSR)) for which the preference parameter indicates preference.

According to an illustrative embodiment of the first aspect, the priority of each of said at least two modulation schemes is determined depending on a link quality parameter value associated with the respective modulation scheme, said link quality parameter indicating a quality of a transmission using the respective modulation scheme from said link quality report receiving station to said link quality report sending station.

According to a further illustrative embodiment of the first aspect, the priority of each of said at least two modulation schemes is determined depending on a preference parameter associated with the modulation scheme, said preference parameter indicating a different preference, e.g. a lower preference, for a modulation scheme which is provided for compatibility reasons than for a modulation scheme which is not or not only used for compatibility reasons.

In a similar illustrative embodiment of this aspect, said preference parameter indicates a different preference, e.g. a lower preference, for a modulation scheme which is only used in the transmission to the link quality report sending station for retransmission and/or compatibility reasons. According to an illustrative embodiment based on this example of a lower preference, a relatively low priority is associated with a modulation schemes which has been only used for retransmission and/or compatibility reasons, wherein the relatively low priority is lower than a priority that would have been associated with the modulation scheme if it would not have been only used for retransmission and/or compatibility reasons.

According to a still further illustrative embodiment of the first aspect, the priority of each of said at least two modulation schemes is determined depending on whether the modulation scheme has been used for signalling to the link quality report sending station or whether the modulation scheme has been used for transmitting payload to the link quality report sending station. According to a further illustrative embodiment, a modulation scheme's occurrences, e.g. occurrences of data units, for signalling to the link quality report sending station are not counted or are counted separately from occurrences where payload is transmitted to the link quality report sending station.

According to a still further illustrative embodiment of the first aspect, the link quality report sending station is a terminal.

According to a still further illustrative embodiment of the first aspect, the link quality report sending station is a mobile station.

According to a still further illustrative embodiment of the first aspect, the link quality report receiving station is a network.

According to a still further illustrative embodiment of the first aspect, the link quality report receiving station is a mobile network. For example, according to a still further illustrative embodiment, the link quality report receiving station includes at least one of a base transceiver station and a base station controller of a mobile network.

According to a still further illustrative embodiment of the first aspect, the link quality report receiving station is configured for transmitting data units to the link quality report sending station.

According to a still further illustrative embodiment of the first aspect, the method further comprises the reporting period during which the link quality report sending station determines the one or more modulation schemes which have been used to transmit the data units received by the link quality report sending station. In a further illustrative embodiment of this aspect, only those data units are taken into account for the link quality reporting that are addressed to the link quality report sending station, e.g. where the temporary flow identifier of those data units belongs to the link quality report sending station.

According to a still further illustrative embodiment of the first aspect, the link quality report sending station determines for each of at least two modulation schemes, which have been used to transmit the data units received during the reporting period, a value of the link quality parameter corresponding to the respective modulation scheme on the basis of the quality of the received data units (sometimes referred to as link quality parameter value of the modulation scheme).

According to a still further illustrative embodiment of the first aspect, said selecting at least one of said at least two modulation schemes is performed in the case that the number of different modulation schemes received in the reporting period and addressed to the link quality report sending station exceeds a number N of modulation schemes for which the link quality report sending station is allowed to report link quality information.

According to a still further illustrative embodiment of the first aspect, the method further comprises providing for each modulation scheme at least one reference value associated therewith. There are various ways to provide a reference value, e.g. by predefining a value or by sending it to the link quality report sending station.

According to a still further illustrative embodiment of the first aspect, the priority of each of the at least two modulation schemes is determined depending on the link quality parameter value as well as on the at least one reference value which are both associated with the respective modulation scheme.

According to a still further illustrative embodiment of the first aspect, the modulation scheme's priority depends on the difference of the link quality parameter value and the reference value of the respective modulation scheme, in particular on the absolute value or the square of the difference.

According to an illustrative embodiment, the at least one reference value defines a range. A range may have one range boundary, i.e. the range may be open to one side. Further, a range may have two range boundaries. In an embodiment, a range with two boundaries is defined by two reference values, e.g. one for each boundary.

According to a still further illustrative embodiment of the first aspect, for at least one of said modulation schemes the priority of the modulation scheme is determined depending on whether the link quality parameter value of the modulation scheme is within the range associated with the modulation scheme or whether the link quality parameter value of the modulation scheme is outside the range associated with the modulation scheme.

According to a still further illustrative embodiment of the first aspect, the at least one reference value or the range is modulation scheme specific.

According to a still further illustrative embodiment of the first aspect, link quality information is reported separately for the different modulation schemes.

According to a still further illustrative embodiment of the first aspect, a transmission format is defined by a single modulation scheme or by a subset of transmission format elements which belong to a single modulation scheme. For example, according to a still further illustrative embodiment, a transmission format element is a modulation and coding scheme in GSM.

In a further illustrative embodiment of the first aspect, a preference parameter is associated with a modulation scheme and this preference parameter is also associated with the transmission formats which use this modulation scheme. In another illustrative embodiment of the first aspect, a preference parameter is associated with a transmission format and, for example, if the transmission format is not only used for compatibility and/or retransmissions, indicates that the transmission format is preferred, but, if the transmission format is only used for compatibility and/or retransmissions, indicates that the transmission format is not preferred.

In a further illustrative embodiment of the first aspect, the priority of a transmission format depends on the preference parameter associated with the transmission format in an analogue way as the priority of a modulation scheme depends on the preference parameter associated with the modulation scheme.

In a further illustrative embodiment of the first aspect, a modulation scheme's/transmission format's priority determination depending on at least one of (i) to (iii) is combined with another dependency such as the number of occurrences, e.g. occurrences of data units, using the modulation scheme/transmission format which the link quality report sending station has received during the reporting period.

According to a still further illustrative embodiment of the first aspect, for said selection of said at least one modulation scheme with the highest priority for the link quality report, the transmission formats are grouped into a coarse order according to at least two classes of transmission formats.

According to a still further illustrative embodiment of the first aspect, the at least two classes of transmission formats include a first class with higher priority comprising transmission formats which have been used to transmit data units received by and addressed to the link quality report sending station during the reporting period and whose respective link quality parameter values are in a first predetermined relationship with the corresponding at least one reference value. For example, according to an illustrative embodiment wherein the at least one reference value defines a range, a transmission format belongs to the first class if the respective link quality parameter value is inside the corresponding range in which the use of the respective transmission format is deemed attractive, in particular from the current link performance perspective.

According to a still further illustrative embodiment of the first aspect, the at least two classes of transmission formats include a second class with lower priority comprising transmission formats which have been used to transmit data units received by and addressed to the link quality report sending station during the reporting period and whose respective link quality parameter values are in a second predetermined relationship with the corresponding at least one reference value, wherein the second predetermined relationship differs from said first predetermined relationship. For example, according to an illustrative embodiment wherein the at least one reference value defines a range, a transmission format belongs to the second class if the respective link quality parameter value is outside the corresponding range in which the use of the respective transmission format is deemed attractive, in particular from the current link performance perspective.

According to another illustrative embodiment, the ranges and rules are defined such that a transmission format's link quality parameter value being outside the corresponding range results in a first class which contains the transmission formats which have the highest priority for inclusion in the link quality report. For example, referring to "a range" or "the range" does not exclude a situation where the range which defines that a transmission format belongs to the first class comprises two or more range portions.

According to a still further illustrative embodiment of the first aspect, within at least one of said classes, at least two of said transmission formats have a fine order according to which a priority of a transmission format is the higher, the more often data units, which are addressed to the link quality report sending station and which use the respective transmission format, have been received during the reporting period.

According to a still further illustrative embodiment of the first aspect, the priority of a modulation scheme is given by the priority of the transmission format with the highest priority that uses the respective modulation scheme. For example: First, transmission formats used in data units addressed to and received by the link quality report sending station are ranked by associating respective priorities with the transmission formats. Then the ranking of the transmission formats is converted into a ranking of modulation schemes by replacing the transmission formats with the respective modulation schemes used by the transmission formats and ignoring transmission formats for which there is a transmission format with higher ranking using the same modulation scheme.

According to a second aspect of the herein disclosed subject matter, a link quality report sending station is provided, said link quality report sending station being configured for reporting, in a link quality report, link quality information from the link quality report sending station to a link quality report receiving station.

According to the second aspect, the link quality report receiving station is capable of using different modulation schemes for communicating to the link quality report sending station, wherein a modulation scheme is defined by at least a modulation and a symbol rate.

Further according to the second aspect, said link quality report sending station comprises a ranking unit for determining a priority of each of at least two of said modulation schemes wherein said priority is the priority for inclusion of link quality information of the corresponding modulation scheme in said link quality report.

The link quality report sending station comprises a selector for selecting at least one of said at least two modulation schemes for inclusion of link quality information of the selected at least one modulation scheme in said link quality report depending on a priority of each of said at least two modulation schemes. Herein, the selected at least one modulation scheme is/are the modulation scheme(s) having the highest priority.

According to the second aspect, the ranking unit is configured for determining said priority of each of said at least two modulation schemes depending on at least one of
  (i) a link quality parameter value associated with the respective modulation scheme, said link quality parameter indicating a quality of a transmission using the respective modulation scheme from said link quality report receiving station to said link quality report sending station,
  (ii) a preference parameter associated with the modulation scheme, e.g. said preference parameter indicating a different preference, in particular a lower preference, for the modulation scheme if the modulation scheme is used only for at least one of compatibility reasons and retransmission, and
  (iii) whether the modulation scheme has been used for signalling to the link quality report sending station or whether the modulation scheme has been used for transmitting payload to the link quality report sending station.

According to a still further illustrative embodiment of the second aspect, the link quality report sending station or parts thereof are configured in accordance with the illustrative embodiments and examples of the first aspect of the herein disclosed subject matter. Moreover, according to further illustrative embodiments of the second aspect, the link quality report sending station may use any suitable principle or embodiment of the herein disclosed subject matter to select the modulation schemes for which the link quality is reported.

According to a third aspect of the subject matter disclosed herein, a method for operating a link quality report receiving station is provided, wherein the link quality report receiving station is capable of using different modulation schemes for communicating to a link quality report sending station. A modulation scheme is defined by at least a modulation and a symbol rate.

The method according to the third aspect comprises providing to the link quality report sending station ranking information for allowing the link quality report sending station to determine a priority of at least two of said different modulation schemes for a link quality report depending on the ranking information.

According to a further illustrative embodiment of the third aspect, the ranking information allows the link quality report sending station to report the link quality to the link quality report receiving station according to one or more of the illustrative embodiments and examples of the herein disclosed subject matter. In particular, the ranking information allows the link quality report sending station to report the link quality to the link quality report receiving station according to one or more of the illustrative embodiments and examples of the subject matter of the first aspect.

For example, according to a still further illustrative embodiment of the third aspect, said ranking information includes for at least one modulation scheme at least one reference value, e.g. a range, which is associated with the respective modulation scheme, for allowing the link quality report sending station to determine a priority of the modulation scheme for a link quality report depending on a link quality parameter value of the modulation scheme determined by the link quality report sending station as well as depending on the at least one reference value associated with the modulation scheme. According to further illustrative embodiments, the ranking information provided to the link quality report sending station results in, or triggers, or operates, or configures, or provides parameters to the link quality report sending station for determining the priority of the respective modulation scheme. In this sense, herein, the term "allowing" encompasses "resulting in", "triggering", "operating", "configuring", "parameterising".

According to a still further illustrative embodiment of the third aspect, the ranking information allows the link quality report sending station to report the link quality for those modulation schemes which have the highest priority, unless the link quality can be reported for all received modulation schemes. An example of the use of the ranking information is that the link quality report receiving station influences or controls the determination of priorities of modulation schemes in the link quality report sending station. The ranking information is used to configure the determination of priorities of modulation schemes in the link quality report sending station, for example according to the preferences of a network operator and/or the desired quality of service of the transmission (e.g. in terms of data rate and latency).

According to a further illustrative embodiment of the third aspect, the priority depends on whether the link quality parameter value is inside the range for said modulation scheme.

According to a still further illustrative embodiment of the third aspect, said ranking information includes a priority reduction parameter indicating to what extent the priority of a modulation scheme shall be reduced depending on a preference of the modulation scheme, for thereby allowing the link quality report sending station to determine a priority of the modulation scheme for a link quality report depending on the priority reduction parameter. According to an illustrative embodiment, the preference is given by the preference parameter.

According to a still further illustrative embodiment of the third aspect, said ranking information includes a priority reduction parameter indicating to what extent the priority of a transmission format shall be reduced depending on a preference of the transmission format, for thereby allowing the link quality report sending station to determine a priority of the corresponding modulation scheme for a link quality report depending on the priority reduction parameter. According to an illustrative embodiment, the preference is given by the preference parameter.

According to a still further illustrative embodiment of the third aspect, said ranking information includes a priority reduction parameter indicating to what extent the priority of a transmission format shall be reduced if the transmission format is provided for compatibility reasons, for thereby allowing (e.g. configuring/parameterising) the link quality report sending station to determine a priority of a modulation scheme used by the transmission format for a link quality report depending on the priority reduction parameter.

In the above mentioned embodiments, the term "to what extent the priority of a modulation scheme/transmission format shall be reduced" includes "whether or not the priority of a modulation scheme/transmission format shall be reduced". In particular the "extent" also includes zero. An example of reducing the priority of a modulation scheme/transmission format is assigning it to a class of modulation schemes/transmission formats with lower priority than modulations schemes/transmission formats whose priority is not reduced.

According to a still further illustrative embodiment of the third aspect, the ranking information signals to the link quality report sending station which of at least two criteria has to be ranked or weighted higher. Herein the term criteria includes ranking criteria and/or selection criteria. A ranking criterion as well as a selection criterion may include at least one of a number of occurrences of a modulation scheme/transmission format within a reporting period, a link quality parameter value, e.g. a MEAN_BEP or CV_BEP, an indication of signalling, an indication of retransmission, etc.

According to a fourth aspect of the subject matter disclosed herein, a link quality report receiving station for communicating with a link quality report sending station is provided, wherein the link quality report receiving station is capable of transmitting to the link quality report sending station using different modulation schemes and wherein a modulation scheme is defined by at least a modulation and a symbol rate.

According to the fourth aspect, the link quality report receiving station comprises a controller for providing to the link quality report sending station ranking information for allowing the link quality report sending station to determine a priority of at least two of said different modulation schemes for a link quality report depending on the ranking information.

According to an illustrative embodiment of the fourth aspect, the link quality report receiving station or parts thereof are configured in accordance with one or more of the embodiments and examples according to the first aspect of the subject matter disclosed herein.

According to still another illustrative embodiment of the fourth aspect, the link quality report receiving station or parts thereof are configured in accordance with one or more of the embodiments and examples according to the second aspect of the subject matter disclosed herein.

According to still another illustrative embodiment of the fourth aspect, the link quality report receiving station or parts thereof are configured in accordance with one or more of the embodiments and examples according to the third aspect of the subject matter disclosed herein.

According to a fifth aspect of the subject matter disclosed herein, a program element for a device is provided, said program element being configured to enable said device to carry out the method according to one or more illustrative embodiments or examples of the first aspect of the subject matter disclosed herein.

According to an illustrative embodiment of the fifth aspect, the device is a link quality report sending station.

According to a sixth aspect of the subject matter disclosed herein, a program element for a device is provided, said program element being configured to enable said device to carry out the method according to one or more illustrative embodiments or examples of the third aspect of the subject matter disclosed herein.

According to an illustrative embodiment of the sixth aspect, the device is a link quality report receiving station.

Generally and in accordance with illustrative embodiments of the herein disclosed subject matter, in order to limit the number of modulation schemes to report and/or increase the available space in the link quality report, one or more of the following are proposed:

Report a subset of modulation schemes, selected not merely on the modulation schemes' number of occurrences, but also on the expected usefulness of the corresponding link quality information for the link adaptation.

Reduce the number of bits needed to signal the reported modulation schemes by removing unrealistic or useless combinations of modulations.

Report a single CV_BEP that is representative of all modulations rather than a CV_BEP per modulation scheme.

Indicate that the BEP estimates of one or more modulation schemes have not changed from the previous report.

In the following there will be described exemplary illustrative embodiments of the herein disclosed subject matter which refer to specific combinations of features. It has to be pointed out that of course any other combination of features is also possible.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1A and FIG. 1B show a flow chart of a method in a link quality report sending station for EGPRS2-A in accordance with illustrative embodiments of the herein disclosed subject matter.

DETAILED DESCRIPTION

Figure 1A:
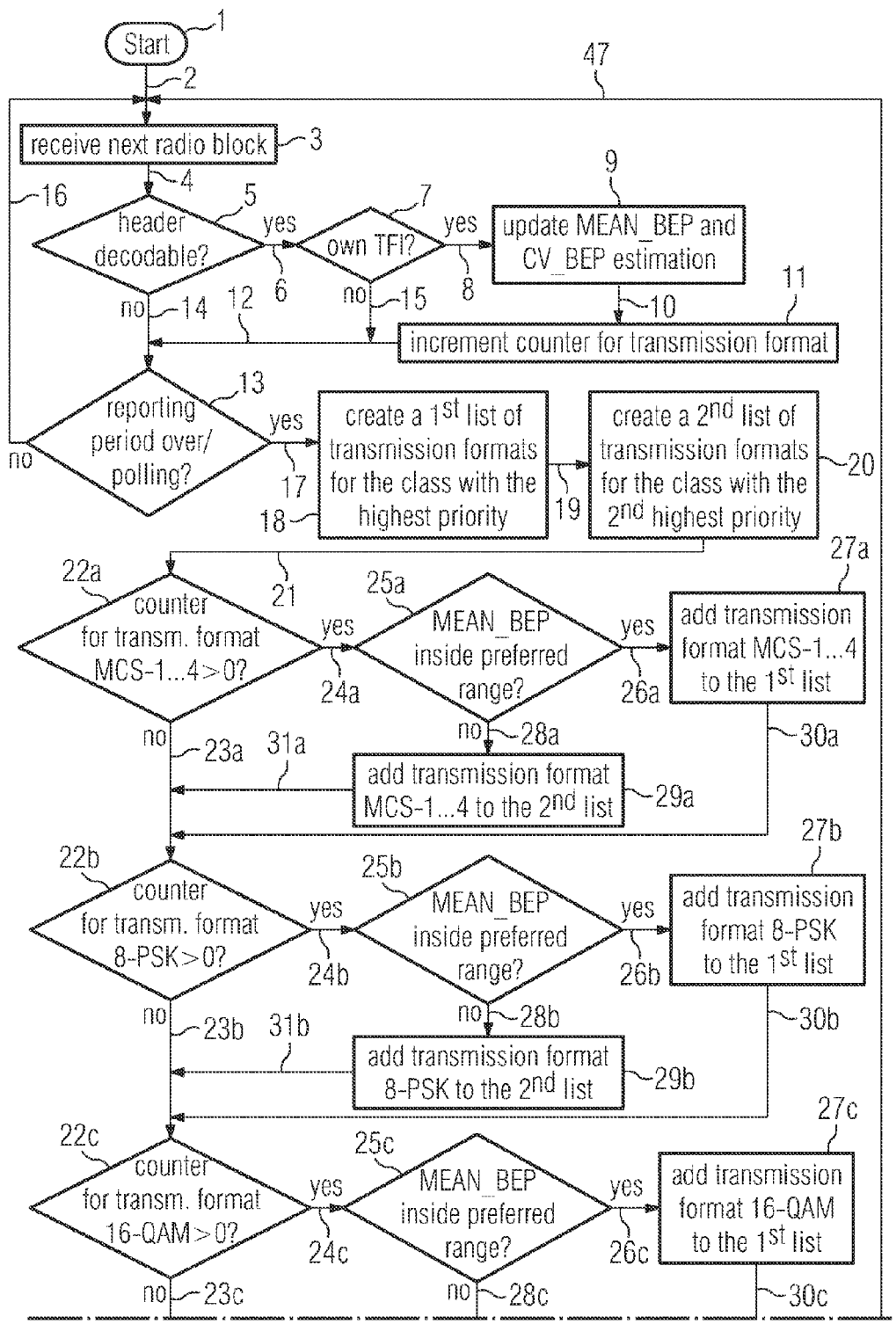

The illustration in the drawings is schematic.

A transmission between a link quality report receiving station in the form of mobile network and a link quality report sending station in the form of a terminal, in the following called MS (mobile station), is considered. The transmission is grouped into data units which are entities that can be decoded. In EGPRS, the data units are called radio blocks and comprise four bursts on the air interface. A radio block can contain information for up to three different MS:

- payload data for the MS to which the radio block is addressed, the address being the TFI,
- an uplink state flag (USF) for all the MS that are receiving the same timeslots, indicating which MS is allowed to use the uplink next,
- a piggy-backed acknowledgement/negative acknowledgement message (PAN) which indicates to mobile stations which radio blocks the network has correctly received on the uplink and which not.

In EGPRS2, there are up to 7 combinations of modulation and symbol rate, in the following referred to as modulation schemes. For each modulation scheme, at least two code rates are available, resulting in different trade-offs between error protection by channel coding and peak RLC (radio link control) data rate. A modulation and coding scheme is defined by such a combination of a modulation scheme and a peak RLC data rate. The link adaptation of the network selects a modulation and coding scheme that fits to the radio conditions.

In EGPRS, a MS estimates the bit error probability (BEP) for each burst. A MS can be ordered to report link quality information about the downlink reception to the network in terms of estimates of a mean BEP and a coefficient indicating the variation of the BEP. The GSM specification calls these parameters MEAN_BEP and CV_BEP. The MS has to report them for each modulation scheme separately. The time from one report to the next is called reporting period.

For the choice of a modulation and coding scheme that gives a good balance between throughput and block error rate in the downlink, a network relies on reports from the MS. Reporting link quality costs bandwidth in the uplink. Hence it is desirable not to waste uplink bandwidth by reporting only those link quality parameters which the link adaptation really needs to make a good choice.

EGPRS2-A uses normal symbol rate (NSR, 270.833 ksymbols/s) with the modulations GMSK, 8-PSK, 16-QAM and 32-QAM. Normally, at a given radio condition, only the modulation and coding schemes of one or two modulation schemes come into consideration. The modulation and coding schemes of all other modulation schemes are either more robust than needed or have too high an error rate, resulting in suboptimal throughput and/or high latency. Hence reporting the link quality parameters of these other modulation schemes would waste uplink bandwidth.

EGPRS2-B uses preferably GMSK at NSR and three modulations at higher symbol rate (HSR, 325 ksymbols/s), namely QPSK, 16-QAM and 32-QAM. In order that MS supporting only EGPRS2-A or EGPRS can decode the USF and the PAN, the network may also use the modulation schemes of EGPRS2-A for compatibility. The statement that only the modulation and coding schemes of one or two modulation schemes come into consideration holds for the preferred modulation schemes of EGPRS2-B, but if the modulation schemes of EGPRS2-A are used as well, there may be up to two other modulation schemes that come into consideration when a modulation scheme from EGPRS2-A must be selected for compatibility.

According to the current standard, the link quality parameters can be either reported for all modulation schemes with which the MS has received radio blocks addressed to it during the reporting period or only for those N=2 modulation schemes with which it has received most of the radio blocks. In a preferred embodiment, the selection of a subset of modulation schemes is not merely based on the modulation schemes' number of occurrences, but also on the expected usefulness of the corresponding link quality information for the link adaptation.

Generally, according to the herein disclosed subject matter, it is proposed to limit the number of modulation schemes to report in the link quality report and/or increase the available space in the link quality report by one or more of the following measures.

A first variant is to report a subset of modulation schemes, selected depending on the expected usefulness of the corresponding link quality information for the link adaptation.

A second variant is to reduce the number of bits needed to signal the reported modulation schemes by removing unrealistic or useless combinations of modulations.

A third variant is to report a single coefficient of variation of the bit error probability (CV_BEP) that is representative of all modulations rather than reporting a variation of the bit error probability per modulation scheme.

A fourth variant is to indicate that the bit error probability (BEP) estimates of one or more modulation schemes have not changed compared to the preceding report.

In accordance with the concepts of the herein disclosed subject matter, a method for reporting, in a link quality report, link quality information from a link quality report sending station, e.g. a mobile station (MS), to a link quality report receiving station, e.g. a mobile network is provided. The link quality report receiving station is capable of using different modulation schemes for communicating to the link quality report sending station, wherein a modulation scheme is defined by at least a modulation and a symbol rate.

The method comprises selecting at least one of said at least two modulation schemes for inclusion of corresponding link quality information in said link quality report, depending on a priority of each of said at least two modulation schemes. Herein, the priority is the priority for inclusion of link quality information of the corresponding modulation scheme in said link quality report and hence the priority represents the expected usefulness of the corresponding link quality information for the link adaptation.

The selected at least one modulation scheme is the modulation scheme (or the modulation schemes in the case of multiple selected modulation schemes) which has the highest priority. According to illustrative embodiments, the priority of each of the at least two modulation schemes is determined depending on at least one of the following options of the above mentioned first variant, which are options for reporting a subset of modulation schemes selected depending on the expected usefulness of the corresponding link quality information for the link adaptation.

(i) According to a first option, the priority of each of the at least two modulation schemes is determined depending on a link quality parameter value associated with the respective modulation scheme wherein the link quality parameter indicates a quality of a transmission using the respective modulation scheme from said link quality report receiving station to said link quality report sending station.

(ii) According to an embodiment of a second option, the priority of each of the at least two modulation schemes is determined depending on a preference parameter associated with the modulation scheme, e.g. wherein the preference parameter indicates a different preference, e.g. a lower preference, for a modulation scheme which is used for compatibility reasons. According to a further embodiment of the second option, the priority of each of the at least two modulation schemes is determined depending on a preference parameter associated with the modulation scheme, wherein the preference parameter indicates a different preference, e.g. a lower preference, for a modulation scheme which is provided only for retransmission.

(iii) According to a third option, the priority of each of the at least two modulation schemes is determined depending on whether the modulation scheme has been used for signalling to the link quality report sending station or whether the modulation scheme has been used for transmitting payload to the link quality report sending station.

One criterion for the link quality is throughput performance. Other criteria may be, for example, latency or an error rate (e.g. a bit or a block error rate).

According to an illustrative embodiment, modulation schemes expected to give the highest throughput for the current channel conditions or the MS receiver performance are ranked the highest while taking into account potential low delay requirements (e.g. for conversational services) or high throughput requirements (e.g. for best effort services).

According to a further illustrative embodiment, transmission formats are defined, each being a modulation scheme or a subset of transmission format elements, e.g. modulation and coding schemes, that belong to the same modulation scheme. An MS counts the number of occurrences of the different transmission formats in radio blocks addressed to it during the current reporting period. At the end of the reporting period, mean bit error probability (MEAN_BEP) estimates and coefficient of variation of the bit error probability (CV_BEP) estimates are calculated for each modulation scheme.

According to an illustrative embodiment, the method for reporting link quality information further comprises providing for each of said at least two modulation schemes a range associated with the respective modulation scheme, wherein the priority of each of said at least two modulation schemes is determined depending on the link quality parameter value and the range which is associated with the respective modulation scheme.

According to an illustrative embodiment, for each modulation scheme, the range may be a MEAN_BEP interval for which the modulation scheme is deemed attractive. This can be implemented by identifying a MEAN_BEP interval for each modulation scheme where the respective modulation scheme contributes to the link adaptation (LA) curve, i.e. where the respective modulation scheme provides the highest throughput among the modulations schemes which are available for the link quality report receiving station for transmitting to the link quality report sending station. However, other implementation methods and/or other parameters may be used for determining an interval or range where the modulation scheme is attractive.

Identifying a MEAN_BEP interval for each modulation scheme where the respective modulation scheme contributes to the link adaptation (LA) curve may be done in any suitable way, e.g. by simulation and/or measurements. According to an embodiment, incremental redundancy is considered for fixing the MEAN_BEP intervals. The ranges or intervals may be defined by at least one reference value or in any other suitable way.

According to an illustrative embodiment, the at least one reference value or the range associated with the respective modulation scheme is standardised.

According to a further illustrative embodiment, the at least one reference value or the range associated with the respective modulation scheme is made network implementation dependent (e.g. the network may communicate the at least one reference value defining the range to the MS). In an example, the network or the link quality report receiving station broadcasts a ranking information element (e.g. the at least one reference value or the range associated with the respective modulation scheme). In another example, the network or the link quality report receiving station communicates a ranking information element (e.g. the at least one reference value or the range associated with the respective modulation scheme) to the link quality report sending station during a transmission initiation phase or at the beginning of the transmission. Examples for the transmission initiation phase are a call setup phase, in particular a data call setup phase, or an initial phase when a communication between the link quality report receiving station and the link quality report sending station is being established. In a further example, the network or the link quality report receiving station broadcasts at least two alternatives for a ranking information element (e.g. alternatives for the at least one reference value or the range associated with the respective modulation scheme), and the network or the link quality report receiving station communicates to the link quality report sending station (in particular during the transmission initiation phase or at the beginning of the transmission) which of the alternatives the link quality report sending station shall apply. In a GSM related example, a ranking information element and/or information about which of several alternatives shall be applied is communicated in an assignment message.

According to a further illustrative embodiment, the at least one reference value or range associated with the respective modulation scheme is MS implementation dependent (e.g. the MS manufacturer may define the at least one threshold and may e.g. declare it to allow for MS conformance testing).

If the ranges are standardised, then a margin will be needed on either side (unless the range is open to one side, e.g. goes on side to the maximum or minimum value of the link quality parameter) to allow for different MS receiver performances. A margin is also needed to take into account any potential low delay requirements or high throughput requirements.

Outside the interval, other modulation schemes are expected to provide higher throughput. If the base transceiver station (BTS) does not support a LA over all existing modulation schemes (e.g. MCS/DAS/DBS) in the downlink (DL), the attractive MEAN_BEP intervals might become BTS implementation dependent.

Using the MEAN_BEP interval of each modulation, the MS can create an ordered list as described in the example subsections which follow. There the method is further elaborated, first in an example of an embodiment of the method in a MS for EGPRS2-B and then in an embodiment of the method in a MS for EGPRS2-A. In these examples, CS-1 and MCS-(both using GMSK) are grouped into a separate transmission format since these modulation and coding schemes are not selected by the link adaptation. The MS counts if CS-1 or MCS-0 are used during the reporting period, and this is done separately from MCS-1 . . . 4. However, since BEP is reported according to the modulation scheme and not according to the transmission format, the BEP estimates for GMSK are updated if any GMSK modulated radio block addressed to the MS is received by it.

The method for reporting link quality information may further take into account a reporting period during which the link quality report sending station determines the one or more modulation schemes which have been used to transmit the data units received by and addressed to the link quality report sending station. Herein the link quality report sending station determines for at least two modulation schemes, which have been used to transmit the data units received during the reporting period, a value of the link quality parameter corresponding to the respective modulation scheme on the basis of the quality of the received data units.

According to an illustrative embodiment, the method for reporting link quality information comprises grouping of transmission formats into a coarse order according to at least two classes of transmission formats for the purpose of selecting said at least one modulation scheme with the highest priority for the link quality report. Herein, the at least two classes of transmission formats include a first class with higher priority, wherein the first class comprises transmission formats with which data units have been addressed to and received by the link quality report sending station during the reporting period and whose respective link quality parameter values are inside the corresponding ranges. Further, the at least two classes of transmission formats include a second class with lower priority, wherein the second class comprises transmission formats with which data units have been received for the link quality report sending station during the reporting period and whose respective link quality parameter values are outside the corresponding ranges.

EGPRS2-B Downlink Temporary Block Flow (DL TBF)

In this subsection, an example is given of an embodiment of the method in a MS for EGPRS2-B.

The transmission formats MCS-1 . . . 4, 8-PSK, 16-QAM (NSR), 32-QAM (NSR), QPSK, 16-QAM (HSR) and 32-QAM (HSR) are grouped into the following classes:

a) MCS-1 . . . 4, QPSK, 16-QAM (HSR) and 32-QAM (HSR) if the MEAN_BEP is inside the respective attractive range, respectively
b) MCS-1 . . . 4, QPSK, 16-QAM (HSR) and 32-QAM (HSR) if the MEAN_BEP is outside the respective attractive range, respectively
c) 8-PSK, 16-QAM (NSR) and 32-QAM (NSR) if the MEAN_BEP is inside the respective attractive range, respectively
d) 8-PSK, 16-QAM (NSR) and 32-QAM (NSR) if the MEAN_BEP is outside the respective attractive range, respectively Herein, classes a) and b) contain transmission formats that are provided intentionally for good performance in a certain TBF mode, i.e. EGPRS2-B in the present example, whereas classes c) and d) are provided for compatibility with other TBF modes, e.g. TBF modes with lower performance. Another use case of transmission formats in classes c) and d) are retransmissions.

In the following, an exemplary example is given for illustrating the above mentioned embodiment of a method for reporting link quality information.

If, for example, with a MEAN_BEP inside the respective attractive range, the transmission formats 16-QAM (HSR), 16-QAM (NSR) and 32-QAM (NSR), and with a MEAN_BEP outside the respective attractive range, the transmission formats 32-QAM (HSR) and 8-PSK have been received by the MS during the reporting period and the received transmission formats have been addressed to the MS, then after the grouping, the classes could have the following members:

a) 16-QAM (HSR)
b) 32-QAM (HSR)
c) 16-QAM (NSR), 32-QAM (NSR)
d) 8-PSK

The list above was written assuming that neither MCS-1 . . . 4 nor QPSK were used during the reporting period.

Then inside each class, the modulation schemes are ordered according to the number of occurrences, thereby providing a fine order within each class. It should be understood that a fine order within a class is only possible if more than one element is contained in the respective class.

Hence, in the above example, the fine order within class c) becomes:

32-QAM (NSR) (more often)
16-QAM (NSR) (less often)

Afterwards, the priority of the modulation schemes is defined in descending order by taking first class a), then b), c) and finally d):

16-QAM (HSR)
32-QAM (HSR)
32-QAM (NSR)
16-QAM (NSR)
8-PSK

In more general terms, a list of transmission formats in descending order of priority is compiled by concatenating the classes in descending order of priority while preserving their internal fine order.

This method has alternatives concerning the prioritisation of the classes a-d:

Another priority sequence could be a, c, b and d. This would make sense if separate LA loops were implemented for the normal EGPRS2-B modulation and coding schemes (MCS-1 . . . 4 and DBS) and for the surrogate modulation and coding schemes used for USF and PAN multiplexing (MCS-5 . . . 9 and DAS).

Yet another way to fix the priorities could be to use a, b, c and d if MCS-1 . . . 4 and DBS-5 . . . 12 account for more than 50% of the radio blocks and to use the priority a, c, b and d otherwise. This avoids that more than half of the radio blocks is probably excluded.

If MCS-1 . . . 4 was not received but CS-1 or MCS-0 was received, CS-1/MCS-0 is appended at the end of the list.

16-QAM (HSR)
32-QAM (HSR)
32-QAM (NSR)
16-QAM (NSR)
8-PSK
CS-1/MCS-0

According to an illustrative embodiment, the link quality information which is reported to the link quality report receiving station is the bit error probability (BEP), in particular in terms of MEAN_BEP and CV_BEP.

The BEP of the N modulation schemes corresponding to the N first transmission formats of the list is reported, for example with N=2.

These steps need only be done as far as it is necessary to determine the N modulation schemes with highest priority. If, for instance, the class a) which has highest priority covers already at least N modulation schemes, the other classes need not be determined and CS-1/MCS-0 need not be appended. In that case, the modulation schemes for which link quality is reported would simply be derived from the N transmission formats in class a) with the highest numbers of occurrences.

According to an illustrative embodiment, the link quality report includes a field signalling for which up to N modulation schemes the link quality information is reported. If the link quality report sending station is allowed to report link quality information for N modulation schemes but less than N different modulation schemes were addressed to and received by the link quality report sending station during the reporting period, the link quality report sending station reports the link quality information only for the less than N different modulation schemes which were addressed to and received by the link quality report sending station during the reporting period, and the link quality report is shorter than in the case where link quality information is reported for N modulation schemes. In an example, the field which signals for which up to N modulation schemes the link quality information is reported signals at the same time how many link quality parameter values follow in the link quality report, e.g. how many 8 bit long fields with MEAN_BEP and CV_BEP values for each of the signalled up to N modulation schemes are present in the link quality report. In this example, MEAN_BEP has a resolution of 5 bit and CV_BEP has a resolution of 3 bit.

According to an illustrative embodiment with N=2, the link quality report includes a field with a size of 5 bit signalling for which 1 or 2 modulation schemes out of 7 the link quality information is reported. In an example, this field which signals the reported modulation schemes also at the same time signals how many link quality parameter values follow, in particular if one or two fields (e.g. with a size of 8 bit) with MEAN_BEP and CV_BEP values corresponding to the signalled 1 or 2 modulation schemes are present in the link quality report. In a similar example, the field with a size of 5 bit signals for which up to 2 modulation schemes out of 7 the link quality information is reported. In that case, it signals at the same time if 0, 1 or 2 fields with link quality information (in particular MEAN_BEP and CV_BEP values) corresponding to the signalled up to two modulation schemes are present in the link quality report.

EGPRS2-A Downlink Temporary Block Flow (DL TBF)

FIGS. 1A/B shows a flow chart for an embodiment of the method for reporting link quality information, the method being intended to be carried out in a link quality report sending station, e.g. in a mobile station.

In particular, in this subsection an example is given of an embodiment of the method in a MS for EGPRS2-A.

Five transmission formats are defined, four of which are grouped into two classes:

a) MCS-1 . . . 4, 8-PSK, 16-QAM and 32-QAM if the MEAN_BEP is inside the respective attractive range, respectively.
b) MCS-1 . . . 4, 8-PSK, 16-QAM and 32-QAM if the MEAN_BEP is outside the respective attractive range, respectively.

Again, each class is internally sorted according to the number of occurrences in descending order and the lists are concatenated (first class a), then class b)), and if MCS-1 . . . 4 was not received but CS-1 or MCS-0 was received, CS-1/MCS-0 is appended at the end of the combined list.

The flow chart in FIG. 1A and FIG. 1B illustrates a possible embodiment of the method executed in a MS for EGPRS2-A in more detail:

The start of the method is indicated at 1 and 2. A radio block is received, indicated at 3. Thereafter, indicated at 4, the MS checks if its header is decodable, indicated at 5, and if so, indicated at 6, if the TFI (temporary flow identifier) shows that the radio block is addressed to the MS, indicated at 7. Only if the latter is the case, indicated at 8, the link quality parameters (MEAN_BEP and CV_BEP estimates) for the corresponding modulation scheme are updated, indicated at 9, and, indicated at 10, the counter for the radio block's transmission format is incremented, indicated at 11.

Figures 1C, 2:
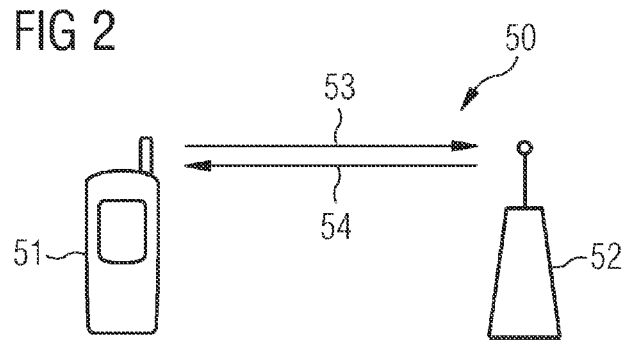
FIG. 1C shows a table of exemplarily defined transmission formats according to illustrative embodiments of the herein disclosed subject matter.
FIG. 2 shows in a schematic manner a link quality report sending station and a link quality report receiving station according to illustrative embodiments of the herein disclosed subject matter.

Five transmission formats are defined in this example, as illustrated in FIG. 1C, and there is a counter for each of them. For GMSK, two transmission formats are defined, and for the other modulation schemes, the transmission format corresponds to the modulation scheme. The modulation schemes in FIG. 1C which are marked with an asterisk (*) are used with normal symbol rate (270.833 ksymbols/s).

If the modulation and coding scheme of the radio block belonged to more than one transmission format, the counters for all corresponding transmission formats would be updated, e.g. incremented, but this case does not occur in this example.

Then, indicated at 12, the MS checks if the reporting period is over, indicated at 13. In the example shown in FIG. 1, the MS checks if the reporting period is over also in the case that the header of the radio block is not decodable, indicated at 14, or if the TFI (temporary flow identifier) shows that the radio block is not addressed to the MS, indicated at 15. According to an embodiment, the network informs the MS by polling about the end of a reporting period. In this case, the check for polling is obsolete if the header is not decodable or if the radio block is not addressed to the MS and the MS continues as in the case of no polling.

If the reporting period is not yet over, indicated at 16, the MS continues by receiving the next radio block, indicated at 3. Otherwise, i.e. if the answer to check 13 is "yes" as indicated at 17, the MS prepares the selection of the modulation schemes for which the link quality is reported by defining different classes of transmission formats with different priority. It creates a 1st list of transmission formats, indicated at 18, for the class with the highest priority and, indicated at 19, creates a 2nd list of transmission formats for the class with the 2nd highest priority, indicated at 20. The lists are initially empty.

Afterwards, indicated at 21, the MS sorts the possible transmission formats for transmitting payload, i.e. MCS-1 . . . 4, 8-PSK, 16-QAM and 32-QAM, into the classes. For each of these classes, the reference numbers bears a distinguishing character, a, b, c, d for MCS-1 . . . 4, 8-PSK, 16-QAM and 32-QAM, respectively. For each of these transmission formats, the MS first checks if it was used during the reporting period, i.e. if the respective counter is greater than 0, indicated at 22a, 22b, 22c, 22d. If not, indicated at 23a, 23b, 23c, 23d, the transmission format is skipped. Otherwise, indicated at 24a, 24b, 24c, 24d, the MS checks, indicated at 25a, 25b, 25c, 25d, whether the value of the relevant link quality parameter, e.g. MEAN_BEP, is inside the preferred range of the respective transmission format. If so, indicated at 26a, 26b, 26c, 26d, the transmission format is added to the list of the class with highest priority, indicated at 27a, 27b, 27c, 27d. Otherwise, i.e. if the value of the relevant link quality parameter is outside the preferred range, i.e. the answer to check of 25a, 25b, 25c, 25d is "no" as indicated at 28a, 28b, 28c, 28d, the transmission format is added to the list of the class with 2nd highest priority, indicated at 29a, 29b, 29c, 29d.

In an illustrative embodiment, after adding the respective transmission format to the first list, indicated at 30a, 30b, 30c, or after adding the respective transmission format to the second list, indicated at 31a, 31b, 31c, or after the respective transmission format has been skipped, indicated at 23a, 23b, 23c, the method proceeds with the next transmission format in checking, whether this transmission format was used during the reporting period.

When all transmission formats that are possible for transmitting payload are processed, i.e. after adding the last transmission format to the first list, indicated at 30d, after adding the last transmission format to the second list, indicated at 31d, or after the last transmission format is skipped, indicated at 23d, each list is ordered according to the number of occurrences. The transmission format with the highest number of occurrences is positioned at the top and the other transmission formats follow in descending order of the number of their occurrences. After that, both lists are merged to a combined list by appending the 2nd list at the end of the 1st list. This ordering and merging is indicated at 32 in FIG. 1B.

Thereafter, indicated at 33, the method checks if MCS-1 . . . 4 is on the combined list, indicated at 34. If MCS-1 . . . 4 is not on the combined list, indicated at 35, the method checks if radio blocks with the transmission format CS-1/MCS-0 were sent to the MS during the reporting period (corresponding counter>0), indicated at 36. If so, indicated at 37, the transmission format CS-1/MCS-0 is appended at the end of the combined list, indicated at 38. Then, indicated at 39, or if the check at 36 is answered with "no", indicated at 40, or if the check at 34 is answered with "yes", indicated at 41, the MS selects the first N (i.e. the N highest ranked) transmission formats, indicated at 42, since the combined list is ordered according to the priority in descending order. The link quality of the corresponding N modulation schemes will be reported to the network.

Then, indicated at 43, the method checks if the last block of the TBF is processed, indicated at 44. If the answer is "no", indicated at 45, i.e. unless the last block of the TBF has been processed, the MS resets the counters for the number of occurrences of the transmission formats, indicated at 46, and continues, indicated at 47, with the reception of the next radio block, indicated at 3. If the answer to check 44 is "yes", indicated at 48, the method terminates, indicated at 49.

Additionally or alternatively, according to the above mentioned second variant, by the method for reporting link quality information according to the herein disclosed subject matter, the number of bits needed to signal the reported modulation schemes is reduced.

For example, selecting 1 or 2 out of 7 possible modulation schemes in downlink would need a 5 bit field (7+21=28 combinations) and selecting 1 . . . 3 out of 7 possible modulation schemes would need a 6 bit field (7+21+35=63 combinations).

The number of bits needed to signal the reported modulation schemes can be reduced by eliminating unrealistic combinations of the reported modulation schemes or by favouring realistic combinations of the reported modulation schemes.

For instance, using QPSK and 32-QAM in the same reporting period is quite unrealistic and hence could be eliminated.

GMSK and 32-QAM is possible (because control blocks use GMSK) however for the data's LA performance this is not interesting hence this pair could also be eliminated.

Most reasonable combinations are modulation scheme pairs which are adjacent to each other, e.g. in terms of modulation order (e.g. in bits per symbol) for the respective TBF mode, e.g. EGPRS2-A or EGPRS2-B. An example of reasonable combinations are modulation scheme pairs which are adjacent to each other in the GSM tables, e.g. in the table 4, table 4 a and table 4 b provided by the document "3GPP TS 43.064 V7.9.0", available under http://www.3gpp.org/ftp/specs/2008-06/Rel-7/43 series/.

Additionally or alternatively, according to the above mentioned third variant, the number of bits needed to signal the reported modulation schemes can be reduced by reporting only one coefficient of variation of the bit error probability (CV_BEP). Since CV_BEP is a normalised parameter that gives an indication of how fast the radio channel is varying, one CV_BEP might suffice for all the modulation schemes.

Additionally or alternatively, according to the above mentioned fourth variant, the number of bits needed to signal the reported modulation schemes can be reduced by indicating that BEP estimates have not changed from the previous link quality report.

If the BEP estimates of the selected modulation schemes to report have not changed from the previous report, then the mobile station could indicate this to the network without actually sending the estimated BEP values again, e.g. using new code words in the field indicating the modulation schemes for which the channel quality is reported.

Referring to the previous report assumes that the network has received and successfully decoded the previous report. It is rather rare but not impossible that there is a decoding failure of a message carrying a channel quality report on the uplink (this message is carried in a CS-1 block which uses the most robust modulation and coding scheme). However even in the case of a decoding failure it is possible that the network sends an acknowledgement for that uplink block to the mobile station thereby letting the mobile station know whether or not a given channel quality report on the uplink is lost. To this end, according to an illustrative embodiment, an appropriate message to the link quality report sending station, e.g. the MS, is defined.

In summary and having regard to illustrative embodiments, for the method to select N modulation schemes for the link quality report when more than N modulation schemes have been received, different transmission formats are defined. In this document, a transmission format denotes either a modulation scheme or a subset of transmission format elements, e.g. modulation and coding schemes, that belong to the same modulation scheme.

To put the transmission formats into an order of priority, at least one of the following aspects are taken into account:

how many times a transmission format was received during the reporting period with a radio block addressed to the MS, if, from the link quality point of view, a transmission format comes into consideration, if a transmission format is preferred or e.g. only used for compatibility with other MS or for retransmissions, if a transmission format has been used for signalling or for transmitting payload.

A transmission format is preferred if the link adaptation will, assuming appropriate radio conditions and no compatibility requirements, select at least one of its modulation and coding schemes for initial transmission of RLC data blocks. For example, in EGPRS2-A DL a preferred transmission format comprises at least one of the modulation and coding schemes MCS-1 . . . 4, DAS-5 . . . 12, whereas in EGPRS2-B DL, a preferred transmission format comprises at least one of the modulation and coding schemes MCS-1 . . . 4, DBS-5 . . . 12.

The assessment of whether a modulation scheme comes into consideration or not may be based on a (i.e. at least one) link quality parameter. Either MEAN_BEP, or a different parameter which need not be reported, based on the bursts' BEP estimates is used. A preferred range of this parameter in which its use is attractive from the link adaptation point of view will be defined for each modulation scheme or even for each transmission format. The preferred range should be large enough to cover low delay requirements as well as high throughput using incremental redundancy.

At least two classes of transmission formats are defined. The classes provide a coarse order of priority. The fine priority order within each class is the higher, the more often a transmission format was received during the reporting period with a radio block addressed to the MS. If there is a draw, another criterion such as the number of bits per symbol of the corresponding modulation scheme is used in an illustrative embodiment, e.g. preference of a modulation scheme with less bits/symbol in a reduced latency call and preference of a modulation scheme with more bits/symbol otherwise. According to an illustrative embodiment, "preferring" means "giving higher priority".

At least some transmission formats that are received during the reporting period in a radio block addressed to the MS are sorted into one of the defined classes. Transmission formats whose value of the corresponding link quality parameter is inside the respective preferred range are put into a class with higher priority than transmission formats whose value of the corresponding link quality parameter is outside the respective preferred range. If preferred and not preferred transmission formats are distinguished in terms of priority for link quality reporting, preferred transmission formats are put into a class with higher priority than not preferred transmission formats. Thus in an embodiment there are four classes of transmission formats that were received during the reporting period in a radio block addressed to the MS a class with highest priority comprising preferred transmission formats whose value of the link quality parameter is inside the respective preferred range, a class with lowest priority comprising not preferred transmission formats whose value of the link quality parameter is outside the respective preferred range, a class comprising not preferred transmission formats whose value of the link quality parameter is inside the respective preferred range, and a class comprising preferred transmission formats whose value of the link quality parameter is outside the respective preferred range.

The relative priority of the last two classes of the list above may depend on the implementation in the network which, in an illustrative embodiment, commands the relative priority to the MS. If in EGPRS2-B for example a link adaptation searches the best modulation and coding scheme out of MCS-1 . . . 4 and DBS-5 . . . 12 and simply maps the chosen modulation and coding scheme to DAS-5 . . . 12 if needed for compatibility or retransmission, information about preferred transmission formats will be more useful—even if the link quality parameter is outside its preferred range—than information about 8-PSK or QAM at NSR.

Signalling uses GMSK modulated coding schemes with a low code rate, CS-1 or MCS-0. For signalling blocks, there is no choice for the link adaptation. If the link adaptation selects GMSK for the transmission of payload, MCS-1 . . . 4 is used. In a preferred embodiment, MCS-1 . . . 4 is grouped into one transmission format and CS-1 and MCS-0 into another. If the transmission format with CS-1/MCS-0 was received during the reporting period, it is taken into account with lowest priority, even lower priority than the lowest class of transmission formats.

Also modulation and coding schemes using 8-PSK may be divided into different transmission formats, e.g. in EGPRS2-A DAS-5 . . . 7 into one transmission format and MCS-7 . . . 8 (which are only used for compatibility with EGPRS MS) into another transmission format.

If there are transmission formats on the priority list which use the same modulation scheme, only the transmission format with highest priority using that modulation scheme remains on the list, the other transmission formats using that modulation scheme are deleted from the list. The modulation schemes corresponding to the N transmission formats with highest priority are chosen for link quality reporting. The link quality report is sent on the uplink in a control message.

In order to recapitulate a possible combination of the above described illustrative embodiments, one can state:

One exemplary method for reporting link quality information from a MS (mobile station) to a mobile network which can use different transmission formats comprises a transmission format denoting a modulation scheme or a subset of its modulation and coding schemes, the mobile network transmitting data units to the MS which form entities that can be decoded, a reporting period during which the MS counts in how many data units a transmission format has been addressed to and received by the MS and at the latest at the end of which the MS updates the link quality information, at least one link quality parameter and a link quality parameter value's preferred range which can be transmission format specific for the case that the number of different modulation schemes received in the reporting period and addressed to the MS exceeds a number N of modulation schemes for which the MS is allowed to report link quality parameters, characterised by a selection of the N modulation schemes with the highest priority for the link quality report, the priorities having a coarse order according to at least two classes of transmission formats, a class with higher priority comprising transmission formats with which payload has been received during the reporting period and whose respective link quality parameter values are inside the corresponding preferred ranges, a class with lower priority comprising transmission formats with which payload has been received during the reporting period and whose respective link quality parameter values are outside the corresponding preferred ranges, and the priorities having a fine order within each class with the higher priority for a transmission format, the more often data units with payload for the MS using the respective transmission format have been received, and the priority of a modulation scheme being given by the priority of the transmission format with the highest priority that uses the respective modulation scheme.

With reference to FIG. 2, illustrative embodiments of a link quality report receiving station are described.

FIG. 2 shows a communication system 50 comprising a link quality report sending station 51, e.g. a mobile station, and a link quality report receiving station 52.

The link quality report receiving station 52 transmits data, e.g. payload data and/or signalling data to the link quality report sending station 51 via link 54. In response hereto, the link quality report sending station selects at least one modulation scheme which has been received by and addressed to the link quality report sending station 51 for inclusion of respective link 54 quality information—that corresponds to the selected at least one modulation scheme—in a link quality report 53 that is transmitted from the link quality report sending station 51 to the link quality report receiving station 52. The selection of the at least one modulation scheme may be performed according to any embodiment or example of the herein disclosed subject matter.

According to an illustrative embodiment of the herein disclosed subject matter, the link quality report receiving station 52 is configured for communicating with a link quality report sending station, e.g. by bidirectional communication. The link quality report receiving station is capable of transmitting to the link quality report sending station using different modulation schemes, wherein a modulation scheme is defined by at least a modulation and a symbol rate. The link quality report receiving station 52 comprising a controller for providing to the link quality report sending station ranking information for allowing the link quality report sending station to determine a priority of at least two of said different modulation schemes for a link quality report 53 depending on the ranking information. According to an illustrative embodiment, the ranking information is part of the data transmitted from the link quality report receiving station 52 to the link quality report sending station 51 over an air interface.

According to an illustrative embodiment, the ranking information includes—for at least one modulation scheme—a range which is associated with the respective modulation scheme. This allows the link quality report sending station to determine a priority of the modulation scheme for a link quality report depending on (i) a link quality parameter value of the modulation scheme determined by the link quality report sending station and (ii) the range associated with the modulation scheme.

According to an illustrative embodiment, the ranking information includes a priority reduction parameter indicating to what extent the priority of a modulation scheme and/or transmission format shall be reduced depending on a preference of the modulation scheme/transmission format. According to an illustrative embodiment, the priority reduction parameter indicates to what extent the priority of a modulation scheme and/or transmission format shall be reduced if the modulation scheme/transmission format has a relatively lower preference, e.g. as indicated by the associated preference parameter. According to an illustrative embodiment, the priority reduction parameter indicates to what extent the priority of a modulation scheme and/or transmission format shall be reduced if the modulation scheme/transmission format is used for compatibility reasons and/or retransmission only. This allows the link quality report sending station 51 to determine a priority of the modulation scheme and/or transmission format for a link quality report 53 depending on the priority reduction parameter, and, according to a further embodiment, on the preference parameter.

According to a further embodiment, the ranking information includes at least one preference parameter.

According to an illustrative embodiment, the ranking information indicates to the link quality report sending station a ranking of at least two selection criteria, which the link quality report sending station takes into account for selecting the at least one modulation scheme for the link quality report.

Selection criteria in this sense include e.g. the link quality parameter value, the preference parameter, the priority reduction parameter, and whether the modulation scheme has been used for signalling or for transmitting payload.

While illustrative embodiments and examples of the herein disclosed subject matter relate to EGPRS2, it should be understood that the concepts, methods and apparatuses disclosed herein are also applicable to other fields and other applications.

According to illustrative embodiments of the invention, any component of the link quality report sending station, e.g. the terminal, or any component of the link quality report receiving station may be provided in the form of respective computer program products which enable a processor to provide the functionality of the respective elements as disclosed herein. According to other embodiments, any component of the link quality report sending station or the link quality report receiving station may be provided in hardware. According to other—mixed—embodiments, some components may be provided in software while other components are provided in hardware.

It should be noted that the term "comprising" does not exclude other elements or steps and the "a" or "an" does not exclude a plurality. Also elements described in association with different embodiments may be combined. Further, stating that the priority of a modulation scheme depends on a certain parameter does not exclude dependence on a further parameter. It should also be noted that reference signs in the claims should not be construed as limiting the scope of the claims.

LIST OF ABBREVIATIONS AND ACRONYMS

ACK positive acknowledgement indicating correct reception of an RLC data block
BEP Bit Error Probability
CS-1 Coding Scheme 1 of GPRS (used in EGPRS and EGPRS2 only for signalling)
MCS EGPRS Modulation and Coding Scheme
DAS EGPRS2 Downlink level A modulation and coding Scheme DAS-5 ... 7 use 8-PSK, DAS-8 ... 9 use 16-QAM (NSR), DAS-10 ... 12 use 32-QAM (NSR)
DBS EGPRS2 Downlink level B modulation and coding Scheme
DBS-5 ... 6 use QPSK, DBS-7 ... 9 use 16-QAM (HSR), DBS-10 ... 12 use 32-QAM (HSR)
DL Downlink
EDGE Enhanced Data Rates for GSM Evolution
EGPRS Enhanced GPRS (supporting MCS-0 ... 9 and CS-1)
EGPRS2 is an enhancement of EGPRS aiming at higher throughput with level A (EGPRS2-A) and level B (EGPRS2-B)
FEC Forward Error Correction
GERAN GSM/EDGE Radio Access Network
GMSK Gaussian Minimum Shift Keying
GPRS General Packet Radio Service
GSM Global System for Mobile Communications
HSR Higher Symbol Rate (325 ksamples/s)
MCS EGPRS Modulation and Coding Scheme
MCS-0 ... 4 use GMSK, MCS-5 ... 9 use 8-PSK
MS Mobile Station
NACK negative acknowledgement indicating a decoding error for an RLC data block
NSR Normal Symbol Rate (270.833 ksamples/s)
PSK Phase Shift Keying
QAM Quadrature Amplitude Modulation
QPSK Quadrature Phase Shift Keying
RLC Radio Link Control
TBF Temporary Block Flow
TFI Temporary Flow Identifier
Note: Three dots indicate a range including the integral numbers in between

The invention claimed is:

1. Method for reporting, in a link quality report, link quality information from a link quality report sending station to a link quality report receiving station, wherein the link quality report receiving station is configured to use different modulation schemes for communicating to the link quality report sending station, wherein a modulation scheme is defined by at least a modulation and a symbol rate, said method comprising:
depending on a priority of each of at least two of said different modulation schemes, selecting at least one of said at least two modulation schemes for inclusion of corresponding link quality information in said link quality report;
said priority being the priority for inclusion of link quality information of the corresponding modulation scheme in said link quality report;
the selected at least one modulation scheme being the modulation scheme(s) having the highest priority; and
the priority of each of said at least two modulation schemes being determined depending on:
(i) a link quality parameter value associated with the respective modulation scheme, said link quality parameter indicating a quality of a transmission using the respective modulation scheme from said link quality report receiving station to said link quality report sending station,
(ii) a preference parameter associated with the modulation scheme,
(iii) whether the modulation scheme has been used for signalling to the link quality report sending station or whether the modulation scheme has been used for transmitting payload to the link quality report sending station, and
(iv) a reference value defining a range which is associated with the respective modulation scheme, for allowing the link quality report sending station to determine a priority of the modulation scheme for a link quality report depending on whether the link quality parameter value of the modulation scheme is within the range associated with the modulation scheme or whether the link quality parameter value of the modulation scheme is outside the range associated with the modulation scheme.

2. Method according to claim 1, wherein the link quality report sending station is a terminal and/or the link quality report receiving station is a network.

3. Method according to claim 1, wherein the link quality report receiving station is configured for transmitting data units to the link quality report sending station, wherein said data units form decodable entities.

4. Method according to claim 3, the method further comprising
a reporting period during which the link quality report sending station determines the one or more modulation schemes which have been used to transmit the data units received by and addressed to the link quality report sending station; and
wherein said link quality report sending station determines for at least two modulation schemes, which have been used to transmit the data units received during the reporting period, a value of the link quality parameter corresponding to the respective modulation scheme on a basis of the quality of the received data units.

5. Method according to claim 4,
wherein a transmission format is defined by a single modulation scheme or by a subset of transmission format elements which belong to a single modulation scheme;
for said selection of said at least one modulation scheme with the highest priority for the link quality report, the transmission formats are grouped into a coarse order according to at least two classes of transmission formats, said at least two classes of transmission formats including
a first class with higher priority comprising transmission formats which have been used to transmit data units received by and addressed to the link quality report sending station during the reporting period and whose respective link quality parameter values are inside the corresponding ranges; and
a second class with lower priority comprising transmission formats which have been used to transmit data units received by and addressed to the link quality report sending station during the reporting period and whose respective link quality parameter values are outside the corresponding ranges.

6. Method according to claim 5, wherein, within at least one of said classes, at least two of said transmission formats have a fine order according to which a priority of a transmission format is the higher, the more often data units, which are addressed to the link quality report sending station and which use the respective transmission format, have been received during the reporting period.

7. Method according to claim 5, the priority of a modulation scheme being given by the priority of the transmission format with the highest priority that uses the respective modulation scheme.

8. Link quality report sending station configured for reporting, in a link quality report, link quality information from the link quality report sending station to a link quality report receiving station, wherein the link quality report receiving station is configured to use different modulation schemes for communicating to the link quality report sending station, wherein a modulation scheme is defined by at least a modulation and a symbol rate, said link quality report sending station comprising:
- a ranking unit for determining a priority of each of at least two of said modulation schemes, said priority being the priority for inclusion of link quality information of the corresponding modulation scheme in said link quality report; and
- a selector for selecting at least one of said at least two modulation schemes for inclusion of link quality information of the selected at least one modulation scheme in said link quality report depending on the priority of each of said at least two modulation schemes, the selected at least one modulation scheme being the modulation scheme(s) having the highest priority;
- wherein said ranking unit is configured for determining said priority of each of said at least two modulation schemes depending on:
  - (i) a link quality parameter value associated with the respective modulation scheme, said link quality parameter indicating a quality of a transmission using the respective modulation scheme from said link quality report receiving station to said link quality report sending station,
  - (ii) a preference parameter associated with the modulation scheme,
  - (iii) whether the modulation scheme has been used for signalling to the link quality report sending station or whether the modulation scheme has been used for transmitting payload to the link quality report sending station, and
  - (iv) a reference value defining a range which is associated with the respective modulation scheme, for allowing the link quality report sending station to determine a priority of the modulation scheme for a link quality report depending on whether the link quality parameter value of the modulation scheme is within the range associated with the modulation scheme or whether the link quality parameter value of the modulation scheme is outside the range associated with the modulation scheme.

9. Method for operating a link quality report receiving station which is configured to use different modulation schemes for communicating to a link quality report sending station, a modulation scheme being defined by at least a modulation and a symbol rate, receiving a link quality report which includes link quality information corresponding to at least one modulation scheme selected depending on the priority of each of at least two of said different modulation schemes, a scheduled at least one modulation scheme being the modulation scheme having the highest priority, the method comprising:
providing to the link quality report sending station ranking information for allowing the link quality report sending station to determine a priority of at least two of said different modulation schemes for a link quality report depending on the ranking information, wherein said ranking information includes for at least one modulation scheme a range which is associated with the respective modulation scheme, for allowing the link quality report sending station to determine a priority of the modulation scheme for a link quality report depending on whether a link quality parameter value of the modulation scheme is within the range associated with the modulation scheme or whether the link quality parameter value of the modulation scheme is outside the range associated with the modulation scheme.

10. Method according to claim 9, wherein
said ranking information includes a priority reduction parameter indicating to what extent the priority of a modulation scheme/transmission format shall be reduced depending on a preference of the modulation scheme/transmission format, for thereby allowing the link quality report sending station to determine a priority of the modulation scheme/transmission format for a link quality report depending on the priority reduction parameter;
wherein said transmission format is defined by a single modulation scheme or by a subset of transmission format elements which belong to a single modulation scheme.

11. Link quality report receiving station for communicating with a link quality report sending station, wherein the link quality report receiving station is configured to transmit to the link quality report sending station using different modulation schemes, a modulation scheme being defined by at least a modulation and a symbol rate, receiving a link quality report which includes link quality information corresponding to at least one modulation scheme selected depending on the priority of each of at least two of said different modulation schemes, a scheduled at least one modulation scheme being the modulation scheme having the highest priority, the link quality report receiving station comprising:
a controller for providing to the link quality report sending station ranking information for allowing the link quality report sending station to determine a priority of at least two of said different modulation schemes for a link quality report depending on the ranking information, wherein said ranking information includes for at least one modulation scheme a range which is associated with the respective modulation scheme, for allowing the link quality report sending station to determine a priority of the modulation scheme for a link quality report depending on whether a link quality parameter value of the modulation scheme is within the range associated with the modulation scheme or whether the link quality parameter value of the modulation scheme is outside the range associated with the modulation scheme.

12. A computer program product, the computer program product comprising a non-transitory computer readable storage medium and a computer program recorded therein, said computer program having a program element for a device, said program element being configured to enable said device to carry out the method according to claim 1.

* * * * *